United States Patent [19]
Greenberg et al.

[11] Patent Number: 6,054,227
[45] Date of Patent: Apr. 25, 2000

[54] PHOTOCATALYTICALLY-ACTIVATED SELF-CLEANING APPLIANCES

[75] Inventors: Charles B. Greenberg, Murrysville; Richard A. Heilman, Wexford, both of Pa.

[73] Assignee: PPG Industries Ohio, Inc., Cleveland, Ohio

[21] Appl. No.: 08/899,265

[22] Filed: Jul. 23, 1997

Related U.S. Application Data

[60] Provisional application No. 60/040,565, Mar. 14, 1997, and provisional application No. 60/040,566, Mar. 14, 1997.

[51] Int. Cl.[7] .................. B32B 9/00; B01J 33/00; A21B 1/00
[52] U.S. Cl. ................. 428/701; 428/432; 428/472; 502/2; 427/585; 427/453; 427/236; 427/237; 427/239; 126/19 R; 126/273 R
[58] Field of Search ............................. 428/469, 471, 428/689, 699, 701, 472, 432, 333, 535, 702; 502/103, 300, 2; 252/62.3; 126/19 R, 273 R; 427/585, 236, 237, 239

[56] References Cited

U.S. PATENT DOCUMENTS

| | | | |
|---|---|---|---|
| 4,180,482 | 12/1979 | Ninshino et al. | 252/455 |
| 4,955,208 | 9/1990 | Kawashima et al. | 62/264 |
| 4,997,576 | 3/1991 | Heller et al. | 210/748 |
| 5,137,607 | 8/1992 | Anderson et al. | 204/59 |
| 5,194,161 | 3/1993 | Heller et al. | 210/748 |
| 5,256,616 | 10/1993 | Heller et al. | 502/350 |
| 5,308,458 | 5/1994 | Urwin et al. | 204/157.6 |
| 5,595,813 | 1/1997 | Ogawa et al. | 428/212 |
| 5,616,532 | 4/1997 | Hller et al. | 502/242 |
| 5,643,436 | 7/1997 | Ogawa et al. | 205/324 |
| 5,668,076 | 9/1997 | Yamagushi et al. | 502/343 |
| 5,670,206 | 9/1997 | Taoda et al. | 427/106 |
| 5,830,252 | 11/1998 | Finley et al. | 65/60.5 |
| 5,849,200 | 12/1998 | Heller et al. | 210/748 |

FOREIGN PATENT DOCUMENTS

| | | |
|---|---|---|
| 0 325 133 | 7/1989 | European Pat. Off. . |
| 0 469 921 | 2/1992 | European Pat. Off. . |
| 0 675 086 | 10/1995 | European Pat. Off. . |
| 0 784 034 | 7/1997 | European Pat. Off. . |
| 44 10 476 | 10/1994 | Germany . |
| 03 094814 | 4/1991 | Japan . |
| 08 313705 | 11/1996 | Japan . |
| 97/00134 | 2/1997 | WIPO . |
| 97/07069 | 2/1997 | WIPO . |
| 97/10186 | 3/1997 | WIPO . |

OTHER PUBLICATIONS

PCT–1239A1 International Search Report of Jul. 20, 1998.

*Primary Examiner*—Deborah Jones
*Assistant Examiner*—Stephen Stein
*Attorney, Agent, or Firm*—Kenneth J. Stachel

[57] ABSTRACT

An appliance is rendered self-cleaning of accumulated organic contaminants on one or more surfaces of the appliance, by coating such surfaces of the appliance with a photocatalytically-activated self-cleaning coating. Upon exposing such coated surfaces to radiation of the appropriate wavelength, for a sufficient interval of time, at least a portion of the organic contaminants present on the photocatalytically-activated self-cleaning coating are removed. The coated surface is thereby cleaned without the need of manual effort or high temperatures. The radiation is generally actinic radiation, and more particularly includes ultraviolet radiation.

26 Claims, 2 Drawing Sheets

PHOTOCATALYTICALLY-ACTIVATED SELF-CLEANING APPLIANCES

CROSS REFERENCE TO RELATED APPLICATIONS

This application claims the benefit of U.S. Provisional Patent Application Ser. No. 60/040,565 filed Mar. 14, 1997, U.S. Provisional Patent Application Ser. No. 60/040,566 filed Mar. 14, 1997, and U.S. application Ser. No. 08/899,257 filed even date herewith in the name of Charles B. Greenberg et al. for a Photocatalytically-Activated Self-Cleaning Article and Method of Making Same are related to the present application and are hereby incorporated herein by reference.

BACKGROUND OF THE INVENTION

1. Field of the Invention

The present invention relates generally to self-cleaning appliances, and more particularly to photocatalytically-activated self-cleaning appliances and methods of making and using such appliances.

2. Description of the Related Art

Various major household appliances, such as conventional gas or electric ovens, microwave ovens, toaster ovens, refrigerators, freezers, dishwashers, clothes washers, clothes dryers, to name a few, require frequent cleaning to remove organic contaminants that have accumulated on various internal and external surfaces of such appliances. Generally this is done manually by application of various cleansers and detergents, often accompanied by scrubbing and wiping.

To avoid such manual cleaning, some self-cleaning appliances, particularly ovens, are presently available. Self-cleaning ovens clean only the interior surfaces of the oven's cooking chamber by heating the oven's cooking chamber to very high temperatures for extended periods of time to burn off organic food residues on the surfaces of the oven's cooking chamber.

Several disadvantages are attendant with such self-cleaning appliances. One disadvantage is the substantial cost of the energy needed to raise and maintain the appliance at self-cleaning temperatures. For example, non-self cleaning ovens operate at a maximum temperature of about 260° C. (500° F.), whereas a self-cleaning oven during the self-cleaning operation operates at temperatures above 649° C. (1200° F.). Other disadvantages include the increased cost associated with equipping such appliances to withstand the high cleaning temperatures, and the deleterious effect of such high temperatures on the appliance itself over time. Another disadvantage is that high temperature self-cleaning is usually limited to internal cooking surfaces.

Methods of removing organic contaminants from surfaces which do not require the high temperatures are available. More particularly, titanium dioxide can provide a photocatalytically-activated self-cleaning (hereinafter "PASC") surface on a substrate. Publications directed to the formation of a titanium dioxide PASC coating on a glass substrate include U.S. Pat. No. 5,595,813 and "Photooxidative Self-cleaning Transparent Titanium Dioxide Films on Glass", Paz et al., J. Mater, Res., Vol. 10, No. 11, pp. 2842–48 (November 1995). Further, a bibliography of patents and articles relating generally to the photocatalytic oxidation of organic compounds is reported in *Bibliography of Work On The Photocatalytic Removal of Hazardous Compounds from Water and Air*, D. Blake, National Renewable Energy Laboratory (May 1994) and in an October 1995 update and an October 1996 update.

U.S. Pat. No. 5,308,458 to Urwin et al. discloses a process for the decomposition of photocatalytically degradable organic material which includes exposing to ultraviolet light an organic material in fluid form present on the surface of a disk, which disk is coated with an anatase titanium dioxide film. The disk rotates to move the organic material radially outward across the surface of the disk.

U.S. Pat. Nos. 5,256,616; 5,194,161 and 4,997,576, all to Heller et al. disclose materials and methods for the photocatalytic oxidation of organic compounds on water. Heller discloses floating beads coated with titanium dioxide to oxidize organic compounds floating on water, such as for example, an oil spill.

Despite the recognition in the art of PASC coating, there is no disclosure of the use of such materials to produce a PASC appliance that would eliminate the drawback of manually cleaning appliances or of presently available self-cleaning appliances.

SUMMARY OF THE INVENTION

The present invention is directed to a self-cleaning appliance and to a method of making and using such an appliance, which appliance is photocatalytically-activated to be self-cleaning of accumulated organic contaminants on one or more surfaces of the appliance. The self-cleaning appliance includes a PASC coating on the surfaces which are to be self-cleaning. In one embodiment, the appliance includes a source of actinic radiation to photocatalytically-activate the PASC coating to self-clean the appliance surface. The source of actinic radiation may be separate from or incorporated into the structure of the appliance.

DESCRIPTION OF PREFERRED EMBODIMENTS

Figure 1:
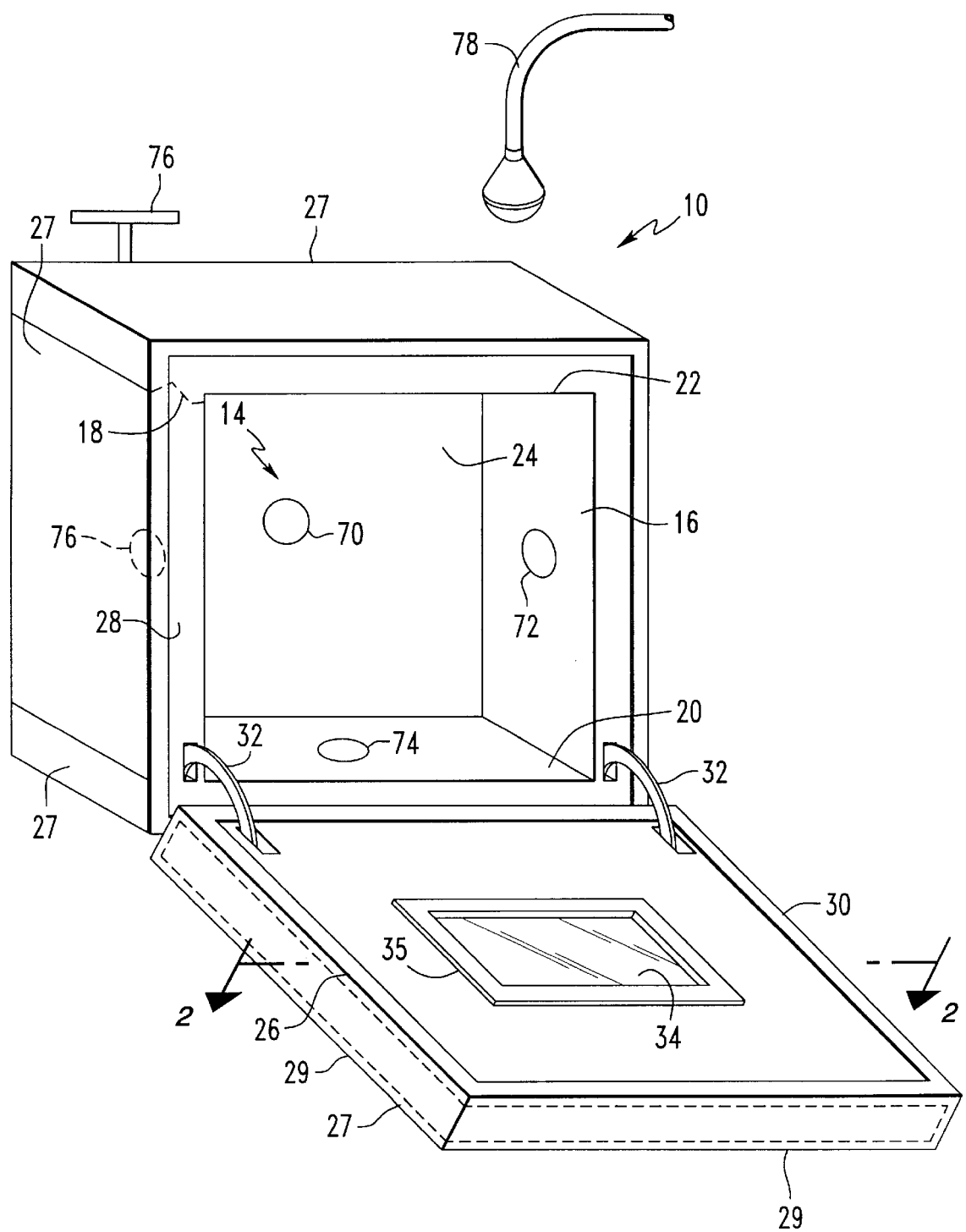
FIG. 1 is a perspective view of a PASC article of manufacture of the present invention, more particularly, a PASC oven.

In the discussion of the figures, it is to be noted that like elements bear like reference numerals. Referring now to FIG. 1 there is shown a PASC oven 10. Oven 10 has been chosen to illustrate the present invention and the following discussion will be directed to oven 10 for simplification, however it is to be understood that the present invention is not limited to an oven, but includes all major household appliances. Further, while the following discussion will be primarily directed to forming a PASC coating within cooking chamber 14 of oven 10, it may be appreciated that the PASC coating may also be provided on any or all of the exterior surfaces of oven 10 to render the exterior surfaces of oven 10 photocatalytically self-cleaning.

The oven 10 includes the cooking chamber 14, which is a closable housing having five integrally connected walls and a door. More particularly, cooking chamber 14 is defined by the interior surfaces of opposed side walls 16 and 18 (shown in phantom); floor 20; a top wall 22 opposed to the floor 20; a back wall 24, and a hinged door 26 opposite to its back wall 24 when the door 26 is in the closed position. The walls, floors and door of cooking chamber 14 are generally made of metal coated with a layer of paint or enamel. A layer of thermally insulating material 27 may be disposed over one or more of the exterior surfaces of the walls, floor and door of cooking chamber 14, to thermally insulate the cooking chamber 14. The layer of thermally insulating material 27 may, in turn, be enclosed with in a housing, not shown, which when present, is typically formed of painted or enameled metal to form a freestanding oven 10.

Oven 10 includes a face plate 28 surrounding the periphery of the opening into the cooking chamber 14, formed when the door 26 is in an open position as shown in FIG. 1. Face plate 28 provides a sealing surface for a seal 30, which seal 30 is affixed to and extends around the periphery of the inner surface of door 26 to form a seal between the inner surface of door 26 and face plate 28 when door 26 is in a closed position.

The door 26 generally includes a metal exterior sheet 29 surrounding insulating material 27 shown in phantom, which sheet 29 may be a painted or enameled metal sheet. The door 26 is affixed by hinges 32, and further generally includes a transparency 34 retained within frame 35 to allow observation into cooking chamber 14 when door 26 is in a closed position.

As may be appreciated, oven 10 includes several additional components, including heating mechanisms, temperature control mechanisms, and the like, which are not necessary to appreciate the instant invention and are therefore not shown in the drawings.

Figure 2:
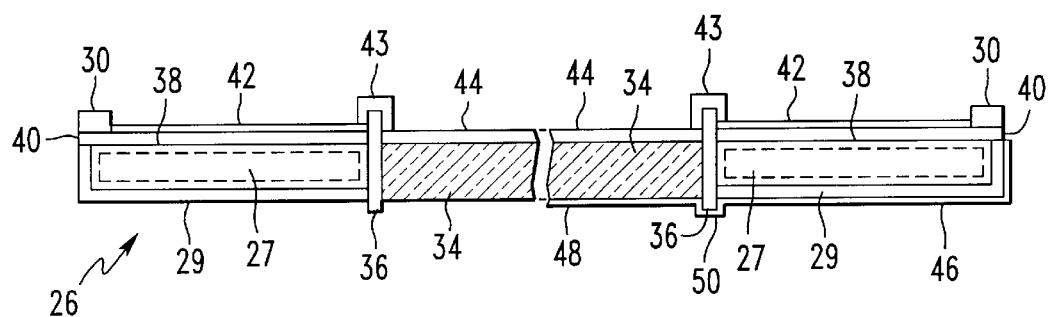
FIG. 2 is a cross section along the line 2—2 of FIG. 1 providing an elevational view of PASC coatings deposited on a door of the appliance of FIG. 1.

In accordance with the present invention, oven 10 has a PASC coating deposited over one or more of interior surfaces and/or exterior surfaces of oven 10. For example, one more of the interior surfaces of cooking chamber 14, e.g. side walls 16 and 18, floor 20, top wall 22, back wall 24, door 26 and transparency 34 may include a PASC coating. Face plate 28 may also have a PASC coating deposited thereon. The left side of FIG. 2, explained in more detail below, illustrates PASC coatings over the various interior surfaces of door 26, while the right side of FIG. 2 illustrates PASC coatings over both the various interior and exterior surfaces of door 26. However, as may be appreciated, when the PASC coating is included on other internal or external surfaces of oven 10, other than those of door 26, the PASC coatings would be included in a like manner as that discussed herein in connection with door 26.

More particularly, a cross section through door 26 along the line 2—2 in FIG. 1 is shown in FIG. 2, illustrating door 26, having transparency 34 retained generally centrally therein within frame 35. Door 26 includes exterior sheet 29 generally opposed to inner surface 38 of door 26 and having insulating material 27 interposed therebetween as shown in phantom in FIG. 2. Inner surface 38 may be overcoated with an enamel layer 40. PASC coatings are shown on the interior surfaces of door 26 on the left side of FIG. 2 as follows. A PASC coating 42 is shown deposited over enamel layer 40, a PASC coating 43 is shown deposited over frame 35 and a PASC coating 44 is shown deposited over the interior surface of transparency 34.

In an alternative embodiment, as shown on the right side of FIG. 2, in addition to the PASC coatings 42, 43 and 44 on the interior surfaces of door 26, the exterior surfaces of door 26 may include PASC coatings as follows. Exterior sheet 29 of oven 10 may also be overcoated with PASC coating 46. Similarly, the exterior surface of transparency 34 may be overcoated with a PASC coating 48, and the exterior surface of frame 35 may also be overcoated with a PASC coating 50. The embodiment shown on the right side of FIG. 2 provides PASC coatings on both the interior and exterior surfaces of oven 10, but as may be appreciated, in alternative embodiments, the PASC coatings may be included on only the interior or exterior surfaces of the oven 10 e.g. wherever self cleaning is desired or required.

Many substrates, particularly glass substrates include sodium ions which can migrate from such surfaces into coatings deposited over such substrates particularly when such substrates are maintained at elevated temperatures (e.g., at least above about 400° C. (752° F.)). When sodium ions migrate into the PASC coatings, the photocatalytic self-cleaning activity of such coatings is reduced if not eliminated. This process is commonly referred to as "sodium poisoning" or "sodium ion poisoning" of the PASC coatings.

Sodium ion poisoning may be prevented either by making the PASC coating thick enough to prevent migration through the coating, or by interposing a sodium ion diffusion barrier layer (hereinafter "SIDB" layer) between the substrate and the PASC coating disposed thereon. U.S. Provisional Patent Application Ser. No. 60/040,566 filed Mar. 14, 1997, and U.S. patent application Ser. No. 08/899,257 filed even date in the name of Charles B. Greenberg et al., entitled "Photocatalytically-Activated Self-Cleaning Article And Method Of Making Same", (hereinafter "the Greenberg et al., application"), contain a detailed discussion of reducing or eliminating sodium ion poisoning of PASC coatings by these methods.

Figure 3:
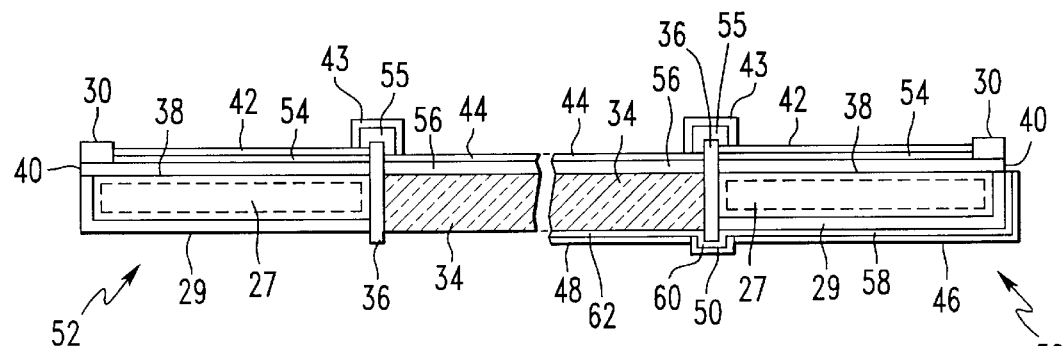
FIG. 3 is view similar to that of FIG. 2, illustrating a sodium ion diffusion barrier layer under the PASC coating.

Shown in FIG. 3 are PASC coatings over the various interior and exterior surfaces of door 52. Door 52 differs from door 26 only in that door 52 includes SIDB layers between each of the PASC coatings and the surfaces of door 52 over which the PASC coatings have been deposited as follows.

Referring to the embodiment shown on the left side of FIG. 3, there is shown door 52 having SIDB layers and PASC coatings over its interior surfaces which include SIDB layer 54 interposed between enamel layer 40 and PASC coating 42, SIDB layer 55 interposed between frame 35 and PASC coating 43, and SIDB layer 56 interposed between the interior surface of transparency 34 and PASC coating 44.

In an alternative embodiment of the present invention as shown on the right side of FIG. 3, in addition to the described PASC coatings and SIDB layers over the interior surfaces of door 52, the door 52 may include SIDB layer 58 interposed between the PASC coating 46 and exterior sheet 29, and an SIDB layer 60 interposed between frame 35 and PASC coating 50, and/or SIDB layer 62 interposed between the exterior surface of transparency 34 and PASC coating 48.

While FIGS. 2 and 3 and the related discussions are directed to doors 26 and 52, as may be appreciated by those skilled in the art, the same arrangement of sodium ion diffusion barrier layers and PASC coatings as shown over doors 26 and 52 may be applied where such layers and coatings are applied over side walls 16 and 18, floor 20, top wall 22 and back wall 24 of cooking chamber 14 or any of the exterior surfaces of oven 10.

PASC coatings compatible with the present invention include photocatalytically-activated self-cleaning oxides in general, and more particularly may be selected from, but not limited to, titanium oxides, iron oxides, silver oxides, copper oxides, tungsten oxides, aluminum oxides, silicon oxides, zinc stannates, molybdenum oxides, zinc oxides, strontium titanate and mixtures thereof. As can be appreciated by those skilled in the art, the metal oxide may include oxides or suboxides of the metal.

A preferred PASC coating is titanium dioxide. Titanium dioxide exists in an amorphous form and three crystalline forms, the anatase, rutile and brookite forms respectively. Titanium oxides, particularly anatase phase titanium dioxide, is preferred because it exhibits the strongest PASC activity, i.e. it exhibits a suitable band gap (i.e. about 360 nm) necessary for photocatalytically-activated self-cleaning and has excellent chemical and physical durability. Further, it has transmission in the visible region of the spectrum making it useful for use on a transparency. The rutile form also exhibits PASC activity. Combinations of the anatase and/or rutile phase with the brookite and/or amorphous phases are acceptable for the present invention provided the combination exhibits PASC activity. A discussion of inducing and measuring photocatalytically-activated self-cleaning activity, and a discussion of what constitutes a sufficient level of PASC to label a surface self-cleaning are discussed below.

SIDB layers compatible with the present invention include amorphous or crystalline metal oxides including metal oxides such as cobalt oxides, chromium oxides and iron oxides, tin oxides, silicon oxides, titanium oxides, zirconium oxides, fluorine-doped tin oxides, aluminum oxides, magnesium oxides, zinc oxides and mixtures thereof. Mixtures include but are not limited to magnesium/aluminum oxides and zinc/tin oxides. As may be appreciated by those skilled in the art, the metal oxide may include oxides or suboxides of the metal.

Aside from sodium ion poisoning considerations, the PASC coating must be sufficiently thick so as to provide an acceptable level of PASC activity. There is no absolute value which renders the PASC coating "acceptable" or "unacceptable" because whether a PASC coating has an acceptable level of PASC activity is determined by the purpose and conditions under which the PASC coated article is being used and the performance standards selected in connection with that purpose. In general, thicker PASC coatings provide higher PASC activity. However, other considerations may weigh toward providing a thinner coating such as increasing transparency of the article for aesthetic or optical reasons; the surface contaminants expected to gather on the surface of the article e.g. the more easily removed the thinner the PASC coating may be; the duration and intensity of ultraviolet light expected to irradiate the PASC coating e.g. where the article is expected to be exposed to much U.V. light, the PASC coating may be thinner and still provide sufficient PASC activity. Still other factors, such as the nature of the substrate may affect PASC coating thickness considerations e.g. whether or not the substrate may subject the PASC coating to sodium ion poisoning. For a wide variety of applications, it is preferred that the PASC coating is at least about 200 to 5000 Angstroms (hereinafter Å), preferably at least about 400 Å and more preferably at least about 500 Å thick. It has been found that when the substrate is a piece of float glass, a PASC coating of an anatase titanium dioxide PASC coating formed directly over the piece of float glass with no SIDB layer, of a thickness of at least about 500 Å provides a PASC reaction rate in the range of about 2 to $5 \times 10^{-3}$ reciprocal centimeters, reciprocal minutes (hereinafter "$cm^{-1}$ $min^{-1}$"). A PASC reaction rate in the foregoing range is acceptable for a wide range of applications.

While the thickness of the SIDB layer necessary to prevent sodium ion poisoning of the PASC coating will vary with several factors, including the chemistry of the SIDB layer, the time period and temperature at which a substrate will be maintained the nature of the substrate and rate of sodium ion migration from the substrate, the thickness of the PASC coating, and the degree of photocatalytic activity required for a given application, typically for most applications, the SIDB layer thickness should be in the range of about 100 Å, preferably at least about 250 Å and more preferably at least about 500 Å thick to prevent sodium ion poisoning of the PASC coating layer.

PASC coatings and/or SIDB layers compatible with the resent invention may be formed on the various surfaces of oven 10 by the sol-gel process, by the spray pyrolysis process, by the chemical vapor deposition process (hereinafter "CVD") or by the magnetron sputtering vacuum deposition process (hereinafter "MSVD"). The PASC coatings and/or SIDB layers may be formed over the surfaces of components of oven 10 after the components have been manufactured and before or after the components have been assembled into oven 10. Alternatively, the PASC coatings and/or SIDB layers may be formed over flat stock which is then formed into the components of oven 10, provided the process of forming the flat stock into the components of oven 10 or the process of assembling the components together to form oven 10 does not appreciably damage the PASC coatings and/or SIDB layers formed on the various surfaces of the components.

Generally, with a sol-gel process a colloidal suspension (the sol) is formed and is applied over a surface at about room temperature and is then converted to a gel with the application of heat. More particularly where the PASC coating is a titanium dioxide PASC coating and is formed by the sol-gel process, a titanium metal-containing precursor is applied over the surface to be coated. The titanium metal containing precursor may be in the form of an uncrystallized alcohol-solvent-based sol solution. The sol solution may include titanium as a titanium alkoxide in an alcohol solvent, which is applied over those surfaces of oven 10 desired to be self-cleaning, by spraying, spinning or dip coating. The sol solution is then heated generally at a rate of about 50° C. per minute to a temperature of about 100 to 400° C. (212° F. to 752° F.), preferably at least about 500° C. (932° F.), and is then generally held at that temperature for about one hour, to calcine the sol solution into a crystalline titanium dioxide PASC coating (the gel).

Where the PASC coating is formed via the spray pyrolysis method, it may be formed as a suspension of relatively water insoluble organometallic coating reactants in an aqueous medium. An aqueous suspension which may be applied by spray pyrolysis includes a metal acetylacetonate compound suspended in an aqueous medium with a chemical wetting agent. Aqueous suspensions for pyrolytic deposition of metal-containing films are described in U.S. Pat. No. 4,719, 127, particularly column 2, line 16, through column 4, line 48, which is hereby incorporated herein by reference. The metal acetylacetonate may be milled by a process known in the art such as jet milling and/or wet grinding to a particle size of less than about 10 microns. The metal acetylacetonate (e.g. titanyl acetylacetonate (TiO $(C_5H_7O_2)_2$) for a titanium dioxide PASC coating) is then added with stirring to the aqueous medium which contains the wetting agent, whereupon an aqueous suspension is formed. The relative concentration of the metal acetylacetonate in the aqueous suspension generally ranges from about 5 to 40 weight percent of the aqueous suspension. The aqueous medium of the aqueous suspension is preferably distilled or deionized water. Suitable wetting agents include any relatively low foaming surfactant. The wetting agent may be an anionic, nonionic or cationic composition, but nonionic is preferred. The wetting agent is typically added at about 0.24% by weight, but can range from about 0.01% to 1% or more.

The aqueous suspension is delivered by pyrolytic spray equipment to the surface of the substrate while the substrate is maintained at a temperature to pyrolytically decompose the metal acetylacetonate and form a crystalline metal oxide PASC coating, e.g. at least about 400° C. (752° F.), more preferably at least about 500° C. (932° F.). As may be appreciated, the make-up and concentration of the pyrolytically sprayed aqueous suspension, the line speed of the substrate passing under the spray pyrolysis equipment or conversely, the rate of passage of the spray pyrolysis equipment over a stationary surface, the number of pyrolytic spray guns, the area to be coated, the spray pressure or volume, the spray pattern, and the temperature of the surface of the substrate at the time of deposition of the pyrolytically sprayed aqueous suspension are all parameters which will affect the final thickness and morphology of the metal oxide PASC coatings formed on the various surfaces of oven 10 by this method. PASC coatings formed by spray pyrolysis are described in U.S. Provisional Patent Application Ser. No. 60/040,566 and the Greenberg et al. application.

A PASC coating of titanium dioxide may be applied by the CVD process as a titanium metal-containing precursor carried in a carrier gas which is directed over a surface of oven 10, while the surface is maintained at a temperature which will facilitate the pyrolytic decomposition of the titanium metal-containing precursor and formation of the crystalline titanium dioxide PASC coating on the surface. The surface temperature to facilitate decomposition is preferred to be at least about 400° C. (752° F.) and more preferably at least about 500° C. (932° F.). Metal-containing precursors compatible with the CVD method include titanium tetraisopropoxide (Ti(OC$_3$H$_7$)$_4$) (hereinafter "TTIP"), titanium tetraethoxide (Ti(OC$_2$H$_5$)$_4$) (hereinafter "TTEt"), titanium tetrachloride (TiCl$_4$) or mixtures thereof. A preferred carrier gas is nitrogen (N$_2$) carrier gas. The concentration of the metal-containing precursor in the carrier gas, the rate of carrier gas flow, the line speed of the substrate passing under the CVD coater or conversely the rate of passage of the CVD coater over a stationary substrate, the surface area being coated, the nature of the chosen metal-containing precursor and the PASC activity required or desired are all factors which will affect the final thickness and morphology of the metal oxide PASC coatings formed on the various surfaces of oven 10 by this method. PASC coatings formed by the CVD process are described in U.S. Provisional Patent Application Ser. No. 60/040,566 and the Greenberg et al. application.

When the PASC coating is a titanium dioxide PASC coating formed by the MSVD process, a target comprised of titanium metal may be sputtered in an argon/O$_2$ atmosphere including about 5–50%, preferably about 20% oxygen, at a pressure of about 5–10 millitorr to produce a titanium dioxide coating of desired thickness, generally at least about 500 Å. While it is possible to heat the surface of the substrate to form a crystalline titanium dioxide PASC coating during the sputtering process, generally it is preferred to heat the substrate after the substrate is removed from the MSVD coater. The cooled substrate is heated to a temperature in the range of about 450° C. to 600° C. (842° F. to 1112° F.) for a time period sufficient to promote formation of the anatase crystalline form of titanium dioxide to provide the PASC coating. Generally, a time at temperature of at least about an hour is preferred. Alternatively, a crystalline form titanium dioxide PASC coating may be grown on the surface of a substrate within the MSVD apparatus directly and without post heat treatment by using a high energy plasma.

SIDB layers compatible with the present invention may similarly be formed on the various surfaces of oven 10 by the sol-gel process, by the spray pyrolysis process, by the CVD process or by the MSVD process.

Where the SIDB layer includes tin oxide and is formed by the spray pyrolysis process, an aqueous suspension of dibutyltin difluoride (C$_4$H$_9$)$_2$SnF$_2$ and water may be applied over a substrate via spray pyrolysis. The aqueous suspension typically contains between 100 to 400 grams of dibutyltin difluoride per liter of water, but as may be appreciated, this ratio may be modified to provide thicker or thinner SIDB layer as required or desired. Wetting agents may be used as suspension enhancers. During the preparation of the aqueous suspension, the dibutyltin difluoride particles may be milled to an average particle size of 1 to 10 microns. The aqueous suspension is preferably vigorously agitated to provide a uniform distribution of particles in suspension. The aqueous suspension is delivered by spray pyrolysis to the surface of the substrate which is at a temperature in the range of about 600° to 700° C. (1112° F. to 1292° F.) whereupon the aqueous suspension pyrolyzes to form a tin oxide SIDB layer. SIDB layers formed by the spray pyrolysis process are described in U.S. Provisional Patent Application Ser. No. 60/040,566 and the Greenberg et al. application which have been incorporated herein by reference.

Where the SIDB layer includes tin oxide and is formed by the CVD process, it may deposited from a metal-containing precursor of monobutyltintrichloride (hereinafter "MBTTCL") vapor in an air carrier gas which is mixed with water vapor, also carried in air. As may be appreciated, the concentration of MBTTCL and water vapor in the air carrier gas is dependent upon several factors including the thickness of the SIDB layer desired, the application rate of the CVD equipment, the size of the surface being coated, the gas flow rate, the tendency of the substrate to permit sodium ion migration, among others. A detailed discussion of SIDB layers formed by the MSVD process may be found in U.S. Provisional Patent Application Ser. No. 60/040,566 and the Greenberg et al. application.

Where the SIDB layer is formed by the MSVD process, a tin oxide or silicon oxide SIDB layer may be formed by sputtering a tin-containing or silicon-containing cathode target respectively in an atmosphere of about 5–80% oxygen at a pressure of about 5–10 millitorr. If it is desired to crystallize the tin oxide or silicon oxide SIDB layer either concurrently with sputtering or subsequently thereafter, the surface of the substrate over which the SIDB layer has been sputtered may be heated. A temperature of at least about 400° C. (752° F.) and preferably at least about 500° C. (932° F.) for at least about one hour is preferred. U.S. patent application Ser. No. 08/597,543 filed Feb. 1, 1996, entitled "Alkali Metal Diffusion Barrier Layer", incorporated herein by reference, discloses the formation of alkali metal diffusion barriers by magnetron sputtering. The barrier layer is taught therein to be generally effective at thicknesses of about 20 Å to about 180 Å, with effectiveness increasing as the density of the barrier increases. Forming an SIDB layer by the MSVD process is also described in U.S. Provisional Patent Application Ser. No. 60/040,566 and the Greenberg et al. application, which have been incorporated herein by reference.

When PASC coatings described above, whether including an SIDB layer or not, are present on surfaces of oven 10, they are rendered self-cleaning upon exposure to radiation of the appropriate wavelength and of the proper intensity for a sufficient interval of time. Where PASC activity is induced by ultraviolet radiation, the source of the ultraviolet radiation may be natural (i.e., solar) or artificial. Artificial is preferred as its intensity and intervals of irradiation are more easily controlled.

Where the PASC coating is a titanium dioxide PASC coating, the radiation which will photocatalytically-activate self-cleaning activity is ultraviolet radiation having a wavelength in the range of about 300 to 400 nanometers (hereinafter "nm").

Artificial ultraviolet radiation sources include a black light source. An alternative light source is available from the Q-Panel Company of Cleveland, Ohio, under the model designation "UVA-340". The intensity of ultraviolet radiation striking the PASC coating is selected so as to obtain a desired self-cleaning activity. Intensities within the range of 5 to 100 watts per square meter (hereinafter "$W/m^2$") preferably of at least about 10 $W/m^2$ and more preferably of at least about 20 $W/m^2$ calibrated at the PASC coating surface are desired. The intensity may be calibrated for example with an ultraviolet meter such as that sold under the trademark BLACK- RAY® by Ultraviolet Products, Inc., of San Gabriel, Calif. under the model designation J-221.

As shown in FIG. 1, an ultraviolet radiation source 70 may be included internally of oven 10 within cooking chamber 14 as an integral component of oven 10. In this embodiment, the internal integral ultraviolet radiation source 70 may be activated/deactivated in any visual manner, including but not limited to a manual on/off switch, a trip switch mechanism that activates integral ultraviolet radiation source 70 when doors 26 or 52 are opened or closed or a mechanical or electrical timer. Oven 10 may include either a single internal integral ultraviolet radiation source 70 or it may include a plurality of internal integral such as ultraviolet radiation sources 70, 72, 74, 76 to ensure uniform ultraviolet irradiation of all surfaces of cooking chamber 14 of oven 10. More particularly, where the cooking chamber 14 of oven 10 has several surfaces which would affect the incident angle of the ultraviolet radiation on the PASC coating(s), more than one integral ultraviolet radiation source may be preferred to be spaced about cooking chamber 14 to ensure that all surfaces receive sufficient ultraviolet irradiation.

Where external surfaces of oven 10 have PASC coatings disposed thereon, either natural ultraviolet radiation (i.e. solar radiation) and/or one or more external artificial ultraviolet radiation sources 78 may be used to photocatalytically-activate the PASC coatings. The external artificial ultraviolet radiation source may be an integral component of oven 10 or it may be a non-integral source which may be freely moved about the internal and external surfaces of oven 10. Such external ultraviolet radiation sources, whether integral or non-integral, may be activated manually or automatically, with trip switches, electrical or mechanical timers and the like.

The duration and intensity for which the source of ultraviolet radiation must be activated depends on a number of factors, including the type of surface on which the PASC coating is applied, the thickness of the PASC coating, the thickness, rate of formation and makeup of the organic contaminants accumulated on the PASC coating, the incident angle of the ultraviolet radiation on the PASC coating, the intensity of the source of ultraviolet radiation at the PASC coating surface, the nature of the function of the appliance itself, the PASC reaction rate desired or required, the degree to which the ultraviolet radiation may be reflected or absorbed by the substrate and/or any other coatings or layers present thereon, to name a few. Therefore, it is not possible to generally prescribe a set time period or intensity for which the ultraviolet radiation source must be activated to obtain self-cleaning. However, for many applications, the source of ultraviolet radiation is preferably activated for at least about 1 to 15 hours each day at an intensity of at least about 20 $W/m^2$ at the surface of the PASC coating to ensure that the bulk of the organic contaminants accumulated on the PASC coating are mineralized.

It is useful to be able to measure and compare the PASC effectiveness or activity of PASC coating(s) formed on the various surfaces of oven 10. In order to evaluate PASC activity a known, readily available organic contaminant may be applied over the PASC coating followed by photocatalytically activating the PASC coating, whereupon the ability of the PASC coating to remove the organic contaminant is observed and measured. Stearic acid, $CH_3(CH_2)_{16}COOH$, is a model organic "contaminant" to test the PASC activity of PASC coatings, because stearic acid is a carboxylic acid with a long hydrocarbon chain and is therefore a good "model molecule" for those present in common contaminants such as household oils and dirt. The stearic acid may be applied over the PASC coating as a thin test film by any convenient technique including dipping, spraying or spin coating over the PASC coating. Generally, stearic acid test films ranging from 10 nm to about 20 nm thick provide an adequate test film. The stearic acid test film may be applied as a stearic acid/methanol solution. A $6\times10^{-3}$ m/l stearic acid/methanol solution has been found to be satisfactory.

The PASC activity of a PASC coating formed on a surface of oven 10 may be estimated qualitatively by overcoating the PASC coating with a stearic acid test film in accordance with the foregoing, exposing the stearic acid coated/PASC coating to ultraviolet radiation from an ultraviolet radiation source at a desired intensity for a desired interval, and examining the stearic acid coated/PASC coating with the unaided eye for either the complete disappearance of the stearic acid test film (which film generally appears as a light brown coating when applied over the PASC coating) or for a decrease in the darkness of the stearic acid test film in comparison to a portion of the stearic acid test film applied over the PASC coating but not exposed to ultraviolet radiation.

The PASC activity of a PASC coating formed on a surface of oven 10 may also be measured quantitatively by measuring the integrated intensity of the carbon-hydrogen (hereinafter "C—H") stretching vibrational absorption bands of the stearic acid present on the PASC coating. The integrated intensity is commensurate with the amount of stearic acid test film remaining on the surface of the PASC coating, and removal of the stearic acid test film by photocatalytically-activated self-cleaning is expected to result in a drop in the C—H stretching vibrational band intensity. The C—H bonds present in the stearic acid absorb infrared radiation (which unlike ultraviolet radiation, does not photocatalytically-activate the PASC coating). This absorption generally occurs between 2800 and 300 $cm^{-1}$ wave numbers, and may be measured with a device such as a Fourier Transform Infrared Spectrophotometer (hereinafter "FTIR"). The FTIR spectrophotometer may be equipped with a detector such as a deuterated triglycine sulface detector (hereinafter "DTGS") or a mercury-cadmium-telluride detector (hereinafter "MCT"). The MCT detector is preferred as it provides a much higher signal-to-noise ratio than the DTGS detector. This can be important where the substrate and/or other coatings present in addition to the PASC coating operate to absorb the infrared radiation which is used by the spectrophotometer to generate the absorption spectrum. Where the infrared radiation is absorbed by the substrate and/or other coatings present, the intensity of the infrared radiation beam that passes through the stearic acid to the detector is dramatically reduced. Combining this with the low concentration of stearic acid present on the surface of the PASC coating which produces a very weak infrared radiation absorption feature and the resultant infrared radiation signal is not particularly intense. Therefore, an instrument equipped with the MCT detector provides a spectrum in which the signal-to-noise ratio is about an order of magnitude higher than those equipped with DTGS detectors. When measuring the PASC activity of transparent films and substrates, the infrared radiation may pass through the stearic acid test film/PASC coating/ substrate and/or any other transparent films and coatings present into the detector. Where the films or substrates will not permit the passage of infrared radiation therethrough, the infrared radiation beam may be directed over the surface at an angle, passing through the stearic acid test film and reflecting off of the sample being tested as opposed to passing therethrough into a detector. This latter method is known as reflection IR spectroscopy.

A PASC reaction rate may be determined for a PASC coating by measuring the rate at which the PASC coating is able to remove a stearic acid test film present on the PASC coating when the PASC coating is exposed to ultraviolet radiation. More particularly, the rate of decrease in the integrated intensity of the C—H stretching vibrational feature (directly proportional to surface coverage) with accumulated time of exposure to ultraviolet radiation provides the PASC reaction rate. For example, an initial PASC activity is measured with the FTIR spectrophotometer for a stearic acid test film present on a PASC coating. The stearic acid test film may or may not have been exposed to ultraviolet radiation for this initial PASC activity measurement. The stearic acid coated PASC coating is then exposed to ultraviolet radiation for a measured interval of time, at the end of which a second PASC activity measurement is made with the FTIR spectrophotometer. The integrated intensity of the C—H stretching vibrations in the second measurement is expected to be lower than the first, due to the fact that a portion of the stearic acid test film was removed with the exposure to ultraviolet radiation. From these two measurements, a curve may be plotted of integrated intensity of C—H stretching vibrations versus time, the slope of which provides the PASC reaction rate. While two points will suffice to provide a curve, it is preferred that several FTIR measurements are taken during the course of a PASC activity measurement to provide a more accurate curve. While the duration of exposure to ultraviolet radiation between measurements may be kept constant or may be varied as it is the cumulated time of exposure to ultraviolet radiation that is used to plot the curve, the intensity and orientation i.e. coating side or substrate side of the ultraviolet radiation exposure with the sample should be kept constant for all PASC measurements taken when determining the PASC reaction rate.

The PASC reaction rate may be reported in the units of reciprocal centimeters, reciprocal minutes ("$cm^{-1}$ $min^{-1}$"), where the higher the value indicates a greater PASC activity. There is no absolute rate which renders a PASC coating "acceptable" or "unacceptable" because whether the PASC coating has an acceptable level of PASC activity is largely determined for the purpose for which the appliance is used and the performance standards selected in connection with that purpose. Generally, the PASC reaction rate is desired to be as high as possible. Preferably, the PASC reaction rate is at least about $2\times10^{-3}$ $cm^{-1}$ $min^{-1}$ for a stearic acid test film formed over a PASC coating when exposed to ultraviolet radiation of about 20 W/m$^2$ intensity at the coating surface when irradiated from the coating side of the substrate as measured with an FTIR spectrophotometer having an MCT detector, for most applications. More preferably, the PASC reaction rate is at least about $5\times10^{-3}$ $cm^{-1}$ $min^{-1}$ as measured under these same parameters.

It is also useful to measure the thickness of PASC coatings in order to meaningfully determine and compare the PASC activity of PASC coatings because the PASC coating thickness may affect photocatalytic activity (e.g. thicker PASC coatings tend to provide higher PASC reaction rates). The thicknesses of the PASC coating (and/or SIDB layer, if present) may be measured by either Variable Angle Spectroscopic Ellipsometry (hereinafter "VASE") or from profilometer measurements of a deletion edge in the measured film as is known in the art or may be estimated from interference colors as is also known in the art.

Those skilled in the art will appreciate that the PASC coating of the present invention and SIDB layer, if present must be able to withstand the operating parameters of the appliance within which the PASC coating and/or SIDB layer is/are provided. Therefore, for most applications, they must be able to withstand normal wiping and abrasive forces and must also be able to withstand the temperatures at which the appliance operates, as for example, an oven, refrigerator or freezer. They must also be able to withstand exposure to water and detergents, as for example, where the appliance is a clothes washer or dishwasher.

It will be appreciated by those skilled in the art that where the appliance is an oven, the present invention provides a particular advantage over presently available self-cleaning ovens which required unusually high temperatures, (i.e. about 1200° F. (648.9° C.)) to clean the oven as described above. A self-cleaning oven of the present invention which includes the PASC coating on those surfaces of the oven which are desired to be self-cleaning, requires no such high temperatures to clean such surfaces. Therefore, a self-cleaning oven of the present invention will not need to be designed and built to withstand the excessive temperatures associated with presently available high temperature self-cleaning ovens, resulting in significantly reduced manufacturing costs and significantly longer operating life. Further, there is no need to remove the "burnt" organic wastes as is necessary with the presently available high temperature self-cleaning ovens, as the organic wastes of the present invention are mineralized primarily into carbon dioxide and water vapor.

As can be appreciated, the foregoing disclosure is not limiting to the invention and was presented to provide an appreciation of the invention. The scope of the present invention is defined by the following claims.

We claim:

1. A self-cleaning appliance comprising:
    an appliance having at least one surface over which organic contaminants are expected to accumulate and a photocatalytically-activated self-cleaning coating of photocatalytically-activated self-cleaning oxides essentially free of a binder formed on the at least one surface from sol-gel, spray pyrolysis, chemical vapor deposition, and magnetron sputtering vacuum deposition over said surface.

2. The self-cleaning appliance of claim 1 wherein said photocatalytically-activated self-cleaning coating is a metal oxide selected from the group consisting of titanium oxides, iron oxides, silver oxides, copper oxides, tungsten oxides, aluminum oxides, silicon oxides, zinc oxides, zinc stannates, molybdenum oxides, strontium titanate and mixtures thereof.

3. The self-cleaning appliance of claim 2 wherein said metal oxide is a titanium oxide selected from the group consisting of anatase titanium dioxide, rutile titanium dioxide, brookite titanium dioxide and mixtures thereof.

4. The self-cleaning appliance of claim 3 wherein said self-cleaning coating is within the range of about 200 to 5000 Angstroms thick.

5. The self-cleaning appliance of claim 4 wherein said self-cleaning coating is at least about 500 Angstroms thick.

6. The self-cleaning appliance of claim 1 wherein said self-cleaning coating has a photocatalytically-activated self-cleaning activity reaction rate of at least about $2 \times 10^{-3}$ cm$^{-1}$ min$^{-1}$.

7. A self-cleaning appliance comprising:

an appliance having at least one surface over which organic contaminants are expected to accumulate;

a photocatalytically-activated self-cleaning coating of photocatalytically-activated self-cleaning oxides formed on the at least one surface from sol-gel, spray pyrolysis, chemical vapor deposition, or magnetron sputtering vacuum deposition over said surface; and a diffusion barrier layer between said surface and said self-cleaning coating.

8. The self-cleaning appliance of claim 7 wherein said diffusion barrier layer functions as a sodium ion diffusion barrier layer, wherein said sodium ion diffusion barrier layer is a metal oxide selected from the group consisting of amorphous metal oxides, crystalline metal oxides and mixtures thereof.

9. The self-cleaning appliance of claim 8 wherein said sodium ion diffusion barrier layer is selected from the group consisting of cobalt oxides, chromium oxides, iron oxides, tin oxides, silicon oxides, titanium oxides, zirconium oxides, fluorine doped tin oxides, aluminum oxides, magnesium oxides, zinc oxides, magnesium/aluminum oxides, zinc/tin oxides and mixtures thereof.

10. The self-cleaning appliance of claim 7 wherein said diffusion barrier layer is at least about 100 Angstroms thick.

11. The self-cleaning appliance of claim 1 wherein said self-cleaning coating is photocatalytically-activated to be self-cleaning upon irradiation with ultraviolet radiation.

12. A self-cleaning appliance comprising:

an appliance having at least one surface over which organic contaminants are expected to accumulate;

a photocatalytically-activated self-cleaning coating of photocatalytically-activated self-cleaning oxides formed on the at least one surface from sol-gel, spray pyrolysis, chemical vapor deposition, or magnetron sputtering vacuum deposition over said surface; and a means for irradiating said self-cleaning coating with ultraviolet radiation.

13. The self-cleaning appliance of claim 12 wherein said ultraviolet radiation means is integral with said appliance.

14. The self-cleaning appliance of claim 1 further comprising a plurality of said surfaces, wherein said surfaces are the interior surfaces of a closable housing formed from five integrally connected walls and a door, wherein said self-cleaning coating is deposited over said surfaces.

15. The self-cleaning appliance of claim 14 wherein said appliance is an oven.

16. The oven of claim 15 wherein said self-cleaning coating is photocatalytically-activated to be self-cleaning upon irradiation with ultraviolet radiation.

17. The oven of claim 16 further comprising a means for irradiating said self-cleaning coating with ultraviolet radiation.

18. The oven of claim 17 wherein said ultraviolet radiation means is integral with said appliance.

19. A method of making a self-cleaning appliance comprising the steps of:

assembling a plurality of component parts of said appliance to form said appliance;

identifying surfaces of said component parts on which organic contaminants are expected to accumulate;

selecting at least a portion of said identified surfaces to be photocatalytically self-cleaning;

forming on said surface a photocatalytically-activated self-cleaning coating of photocatalytically-activated self-cleaning oxides formed from sol-gel, spray pyrolysis, chemical vapor deposition, or magnetron sputtering vacuum deposition over said selected surfaces.

20. The method of claim 19 wherein said identifying, selecting and forming steps are practiced prior to said assembling step.

21. The method of claim 19 wherein said identifying, selecting and forming steps are practiced subsequent to said assembling step.

22. The method of claim 19 wherein said self-cleaning coating is formed over said selected surfaces by a process selected from the group consisting of chemical vapor deposition, spray pyrolysis and magnetron sputter vacuum deposition.

23. The method of claim 22 wherein said self cleaning coating is a metal oxide selected from the group consisting of titanium oxides, iron oxides, silver oxides, copper oxides, tungsten oxides, aluminum oxides, silicon oxides, zinc oxides, zinc stannates, molybdenum oxides, strontium titanate and mixtures thereof.

24. The self-cleaning appliance of claim 23 wherein said metal oxide is a titanium oxide selected from the group consisting of anatase titanium dioxide, rutile titanium dioxide, brookite titanium dioxide and mixtures thereof.

25. A self-cleaning appliance comprising:

an appliance having at least one surface over which organic contaminants are expected to accumulate and a photocatalytically-activated self-cleaning coating over said surface, and a diffusion barrier layer between said surface and said self-cleaning coating that functions as a sodium ion diffusion barrier layer, wherein said sodium ion diffusion barrier layer is a metal oxide selected from the group consisting of crystalline metal oxides, amorphous metal oxides other than titanium oxide, zirconium oxide and titanium zirconium oxides, and mixtures thereof.

26. A self-cleaning appliance comprising:

an appliance having at least one surface over which organic contaminants are expected to accumulate and a photocatalytically-activated self-cleaning coating over said surface, and a diffusion barrier layer between said surface and said self-cleaning coating that functions as a sodium ion diffusion barrier layer, wherein said sodium ion diffusion barrier layer is a metal oxide selected from the group consisting of cobalt oxides, chromium oxides, iron oxides, tin oxides, silicon oxides, fluorine doped tin oxides, aluminum oxides, magnesium oxides, zinc oxides, magnesium/aluminum oxides, zinc/tin oxides and mixtures thereof and mixtures with titanium oxide, zirconium oxide and titanium and zirconium oxides.

* * * * *